3,639,379
POLYMERIZATION OF PROPYLENE WITH A CHROMIUM OXIDE CATALYST ACTIVATED WITH GROUP IV-A METAL HYDROCARBON
Wendell P. Long, Wilmington, Del., assignor to Hercules Incorporated, Wilmington, Del.
No Drawing. Filed Oct. 17, 1969, Ser. No. 867,353
Int. Cl. C08f 1/42, 3/10
U.S. Cl. 260—93.7                    9 Claims

ABSTRACT OF THE DISCLOSURE

Propylene is polymerized to isotatic polypropylene in high yields and at a high rate with a chromium oxide extended on a silica catalyst and activated by the addition of a tetrahydrocarbon lead, tin or germanium. Preferably the catalyst is chromic oxide extended on silica and partially reduced to from about 55 to about 90%.

---

This invention relates to an improved process for the polymerization of propylene using a solid supported catalyst.

It is well known that 1-olefins can be polymerized at low pressure to solid polymers using gas the catalyst a Group VI–B metal oxide extended on a solid support, e.g., silica, alumina, zirconia or thoria, U.S. 2,691,647 to Field et al describes a process for the polymerization of ethylene and propylene wherein the catalyst is a partially reduced molybdenum trioxide spread on one of these solid supports and activated by addition of an alkali metal. U.S. 2,825,721 to Hogan et al. describes the polymerization of 1-olefins using as the catalyst chromium oxide, wherein at least part of the chromium is in the hexavalent state, extended on a silica-alumina support. While these processes yield a high molecular weight, high density polyethylene, only a relatively low molecular weight polypropylene, of which only a small percentage is stereoregular, is obtained and then in low productivity based on the amount of catalyst used. Various activators for these supported catalysts have been suggested, as, for example, boron hydrides, in U.S. 2,898,326 to Peters et al., and while they give greatly improved results in the polymerization of ethylene, little or no improvement in the yield and/or isotacticity of the polymer has been obtained in the polymerization of propylene.

Now in accordance with this invention, it has been found that by utilizing as the catalyst, chromic oxide extended on a silica support, preferably partially reduced to from about 55 to about 90%, i.e., an average valence state of from 4 to 2.4, in combination with an organometallic compound of a Group IV–A metals, i.e., lead, tin and germanium, it is possible to polymerize propylene and obtain a highly isotactic polymer, in high yields and at a high rate.

The carrier material utilized for preparation of the catalyst can be any silica, alumina, silica-alumina, etc. particulate material which is activated by heat treatment such as described in U.S. 2,825,721. Preferbly, the carrier will be a non-porous, low bulk density silica.

The carrier is then impregnated with an aqueous solution of chromic acid and after drying in air at about 120° C., is heated at higher temperature to remove additional water and in the presence of oxygen to maintain a high oxidation state of the chromium. Instead of using chromic acid for loading the support with chromium, there can be used any water-soluble chromium compound, such as chromic nitrate, which is converted to chromic oxide when heated at elevated temperatures in the presence of oxygen. The amount of chromium loaded on the silica support is not critical but usually will be within the range of from about 0.01% by weight of the support to about 10%.

For use in the process of this invention the supported chromic oxide catalyst is preferably partially reduced. It is well known that neither the wholly hexavalent chromium or wholly divalent chromium oxides are effective as catalysts for the preparation of isotactic polypropylene, but even these oxides are operable catalyst when the Group IV–A organometallic activator is used. However, for optimum rates and yield of isotatic polymer, the chrominium is preferably reduced from the hexavalent state to an average valence level of at least about 4 to about 2.4 and preferably to about 3, i.e., a reduction level betweeen about 55% and 90%, and preferably about 65% to about 75%.

The reduction of the chromic oxide can be carried out by a variety of means. The most effective means of doing so is by controlled reduction of the supported chromic oxide catalyst with carbon monoxide, the amount of reduction being measured by the $CO_2$ evolved or the CO used. The temperature at which this controlled reduction is carried out should be in the range of about 175° to about 300° C. since the higher temperatures, e.g., 500° C. the reductiong oes uncontrollably fast to $Cr^{++}$. The reduction can also be carried out by means of hydrogen. Still another means of reducing the chromic oxide is by treating the catalyst with an aliphatic, cycloaliphatic or alkyl-substituted aromatic hydrocarbon that is free of aliphatic unsaturation to a temperature of from about 20° to about 150° C. The hydrocarbon used can be the same or different from that used for the polymerization process. Exemplary of such hydrocarbons are pentane, hexane, heptane, octane, isooctane, decane, cyclohexane, methylcyclohexane, benzene, toluene, xylene, etc.

The group IV–A organometallic compound that is used as an activator for the supported chromium oxide catalyst can be any tetrahydrocarbon lead, tin or germanium, i.e., any compound having the Formula $MR_4$ where M is lead, tin or germanium and R is any hydrocarbon radical free of ethylenic unsaturation such as alkyl, cycloalkyl, alkyl-cycloalkyl, cycloalkyl-alkyl, aryl, alkaryl and aralkyl radicals. Exemplary of the compounds that can be used are tetramethyltin, tetraethyltin, tetrapropyltin, tetraisopropyltin, tetra(n-butyl)tin, tetraisobutyltin, tetrahexyltin, tetradodecyltin, tetra(cyclohexyl)tin, tetra(methylcyclohexyl)tin, tetra(cyclohexylmethyl)tin, tetraphenyltin, tetrabenzyltin, tetratolyltin, etc.; and the corresponding hydrocarbon compounds of lead and germanium. The amount of the organometallic Group IV–A compound that is used should be such an amount that the molar ratio of the Group IV–A compound to chromium oxide used in the polymerization will be at least 0.1:1, and preferably is from about 1:1 to about 10:1, although ratios as high as 100:1 can be used, the higher ratios not adversely affecting the rate and in some cases giving improved stereospecificity of the polymerization.

The polymerization can be carried out by any desired means which can be a batch or continuous process. Preferably, it will be carried out in the presence of a liquid diluent such as a liquid hydrocarbon which can be any aliphatic, cycloaliphatic or aromatic hydrocarbon free of ethylenic unsaturation. Exemplary of such solvents are pentane, hexane, heptane, isooctane, decane, cyclohexane, benzene, toluene, xylene, etc. A mixture of the propylene and liquid hydrocarbon can be allowed to flow over a fixed catalyst bed or the propylene can be passed into a suspension of the catalyst in the liquid hydrocarbon. In the latter case, the amount of the catalyst used can vary widely but generally will be about 0.5 to about 0.5 g. per 100 ml. of diluent.

The polymerization can be carried out at any temperature of from about 0° to about 120° C., preferably from about 20° to about 80° C., and more preferably from about 40° to about 60° C., under a pressure of from subatmospheric to as high as 30 atm. or more.

The following examples illustrate the process of this invention. All parts and percentages are by weight unless otherwise indicated.

PREPARATION OF THE CARRIER

A commercial pyrogenic silica support having a surface area of from 150 to 380 square meters per gram was annealed at 750° C. for 70 hours in dry air and then was rehydrated with water at 100° C. overnight.

PREPARATION OF THE CATALYST

An aqueous solution of chromic oxide was added to the rehydrated silica, in an amount to give the desired chromic oxide loading, along with sufficient additional water to give a viscous syrup. The viscous mass was first dried in air with stirring at room temperature and then by a stream of air at 120° C. for 16 hours and finally at 260° C. for 30 minutes. The dried mass was then calcined under a stream of oxygen at 500° C. for 30 minutes. The chromic oxide or silica was reduced by heating in an oven at temperatures from 185° to 260° C. while passing CO through for varying times. The extent of reduction was calculated from the $CO_2$ evolved. At the desired reduction level, the CO was displaced at 200–260° C. by argon and the catalyst was stored in an argon-flushed storage bottle.

POLYMERIZATION

The polymerizations were carried out in n-heptane as the diluent which was charged to the polymerization vessel by passing it through a column of 60–200 mesh silica gel directly into the capped vessel which was simultaneously being sparged with argon. The catalyst was then added under argon, avoiding any exposure of either the diluent or catalyst to air. Generally, the amount of catalyst used was sufficient to provide 0.01 to 0.07 millimole of chromium per 100 ml. of the diluent. The polymerization vessel and content were equilibrated at 50° C., activator, if used, was injected, and then propylene was admitted to 40 p.s.i.g. without venting the argon. After stirring for 16 hours at 50° C., the vessel was vented and cooled. The polymer and solids were separated by filtration, washed with heptane and dried at room temperature for 16 hours. The yield of insoluble polymer was obtained by correcting for the weight of the catalyst support originally added. In every case, the insoluble polymer produced was highly isotactic, i.e., stereoregular, polypropylene. An aliquot of the heptane solution was dried to determine the yield of soluble polymer produced.

Examples 1–8

These examples demonstrate the increase in the rate of polymerization, expressed as grams of polymer produced (both soluble and insoluble polymer) per millimole of chromium per atmosphere of propylene per hour (g./mmol Cr/atm./hr.), by the addition of various Group IV-A metal tetrahydrocarbon compounds and at various levels of reduction of the chromium. In these, the amount of chromium on the catalyst support was 0.28%. In Table I are tabulated the percent reduction of the catalyst, the metal compound added and the molar ratio thereof to the chromium oxide used (M:Cr), together with the percent insoluble polymer produced, i.e., percent of the total polymer produced, and the rate.

TABLE I

| Example | Catalyst, percent reduction | Additive | Molar ratio, M:Cr | Polypropylene produced Percent insoluble | Rate |
|---|---|---|---|---|---|
| Control A | 86 | None | | 33 | 0.9 |
| 1 | 84 | $(C_2H_5)_4Sn$ | 1.26 | 24 | 21.6 |
| 2 | 84 | $(C_6H_5)_4Pb$ | 0.7 | 30 | 8.3 |
| 3 | 84 | $(C_5H_{11})_4Ge$ | 0.8 | 27 | 2.3 |
| 4 | 93 | $(C_2H_5)_4Pb$ | 1.35 | 46 | 6.4 |
| Control B | 70 | None | | 42 | 0.2 |
| 5 | 68 | $(C_2H_5)_4Sn$ | 5.7 | 30 | 12.5 |
| 6 | 71 | $(CH_3)_4Sn$ | 1.1 | 27 | 6.2 |
| 7 | 71 | $(C_4H_9)_4Sn$ | 1.1 | 26 | 9.0 |
| 8 | 70 | $(C_2H_5)_4Pb$ | 1.2 | 35 | 13.9 |

In this example the amount of chromium oxide on the catalyst support was 1.4% and the chromic oxide was reduced 62%. Tetraethyltin was used as the activator at a molar ratio of 1.0 to 1 chromium. The percent insoluble polypropylene obtained was 27% and the rate of the polymerization was 10.3 g./mmol Cr/atm./hr. In a duplicate run where no activator was added, there was obtained 22% insoluble polypropylene and the rate of polymerization was 4.2 g./mmol Cr/atm./hr.

What I claim and desire to protect by Letters Patent is:

1. In the process of producing solid polypropylene by contacting propylene with a supported chromium oxide catalyst, the improvement wherein the polymerization is activated by the addition of a Group IV-A metal tetrahydrocarbon in a molar ratio of at least about 0.1:1 of said metal tetrahydrocarbon to said chromium oxide.

2. The process of claim 1 wherein the chromium oxide catalyst is chromic oxide reduced to from about 55% to about 90%.

3. The process of claim 1 wherein the catalyst support is a silica support.

4. The process of claim 2 wherein the Group IV-A metal tetrahydrocarbon is a tetraalkyltin.

5. The process of claim 2 wherein the Group IV-A metal tetrahydrocarbon is a tetraalkyllead.

6. The process of claim 2 wherein the Group IV-A metal hydrocarbon is a tetraalkylgermanium.

7. The process of claim 2 wherein the Group IV-A metal tetrahydrocarbon is a tetraphenyllead.

8. The process of claim 5 wherein the tetraalkyllead is tetraethyllead.

9. The process of claim 4 wherein the tetraalkyltin is tetraethyltin.

References Cited

UNITED STATES PATENTS

| | | | |
|---|---|---|---|
| 2,824,089 | 2/1958 | Peters et al. | 260—94.9 D |
| 3,166,547 | 1/1965 | Loeb | 260—94.9 B |
| 3,208,989 | 9/1965 | Bua et al. | 260—94.9 B |
| 3,362,946 | 1/1968 | Hogan | 260—94.9 D |

JOSEPH L. SCHOFER, Primary Examiner

A. HOLLER, Assistant Examiner

U.S. Cl. X.R.

252—452; 260—94.9 D

PO-1050
(5/69)

UNITED STATES PATENT OFFICE
CERTIFICATE OF CORRECTION

Patent No. 3,639,379     Dated February 1, 1972

Inventor(s) W. P. Long  (Case 5)

It is certified that error appears in the above-identified patent and that said Letters Patent are hereby corrected as shown below:

Col. 1, line 27 of printed patent; page 2, line 4 of spec. -

"gas"     should be     -- as --

Col. 2, line 25 of printed patent; page 4, line 1 of spec. -

"reductiong oes"    should be    -- reduction goes --

Col. 2, line 71 of printed patent; page 5, line 9 of spec. -

"0.5"     should be     -- 0.05 --

Col. 4, line 19 of printed patent; page 7, line 17 of spec. -

-- Example 9 --    was omitted

Signed and sealed this 4th day of July 1972.

(SEAL)
Attest:

EDWARD M. FLETCHER, JR.        ROBERT GOTTSCHALK
Attesting Officer              Commissioner of Patents